US006264373B1

(12) United States Patent
Fujimori et al.

(10) Patent No.: US 6,264,373 B1
(45) Date of Patent: Jul. 24, 2001

(54) OPTICAL TRANSITION DEVICE

(75) Inventors: Brian J. Fujimori, Torrance; Andrew J. Bristol, Santa Monica; Thomas B. Mader, San Jose, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/409,535

(22) Filed: Sep. 30, 1999

(51) Int. Cl.$^7$ ...................................................... G02B 6/38
(52) U.S. Cl. ................... 385/74; 385/53; 385/55; 385/75; 385/76; 385/77
(58) Field of Search .................... 385/74, 53, 55, 385/75, 76, 77, 78

(56) References Cited

U.S. PATENT DOCUMENTS

| 4,451,114 | 5/1984 | Nicia et al. | 350/96.18 |
| 4,690,487 | 9/1987 | Hale et al. | 350/96.21 |
| 4,784,135 | 11/1988 | Boero | 350/96.21 |
| 4,930,858 | 6/1990 | Veenendaal | 350/96.2 |
| 5,199,093 | 3/1993 | Longhurst | 385/88 |

Primary Examiner—Mohammad Sikder
(74) Attorney, Agent, or Firm—T. Gudmestad

(57) ABSTRACT

An optical transition device provides a connection between two fiber structures. The device comprises a first transition body having a first transition body bore therethrough, a first fiber connector connected to the first transition body and having a first connector bore therethrough, a second transition body affixed to the first transition body and having a second transition body bore therethrough, and a second fiber connector connected to the second transition body and having a second connector bore therethrough. The first connector bore, the first transition body bore, the second transition body bore, and the second connector bore are coaxial along a transition axis. A graded-index lens is disposed within the transition body bores with an optical axis of the lens coincident with the transition axis. An axial positioning structure positions the graded-index lens axially along the transition axis.

14 Claims, 1 Drawing Sheet

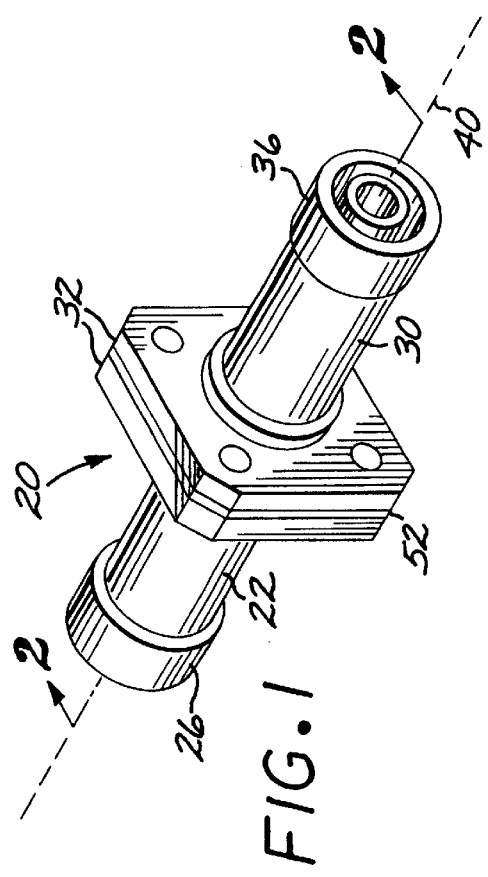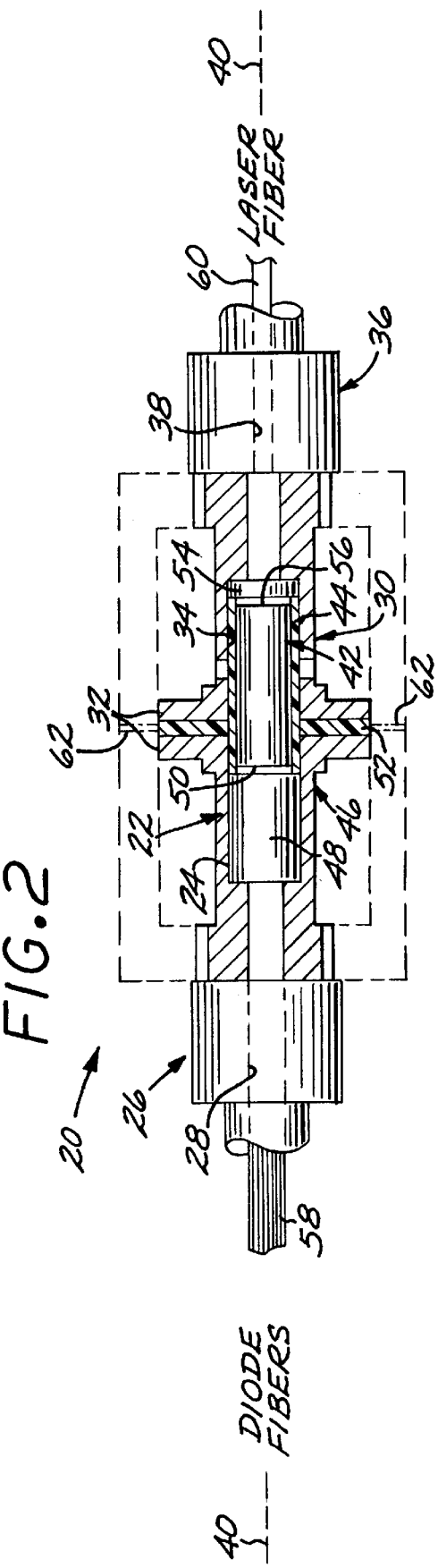

OPTICAL TRANSITION DEVICE

"The invention described herein was made in the performance of work under government Contract No. WITHHELD/96-C-6293 awarded by the Government. The government has certain rights in this invention".

BACKGROUND OF THE INVENTION

This invention relates to a transition between different types of optical-type fibers, and, more particularly, to a transition device that optically connects two different types of optical-type fibers together.

An optical fiber is formed of an optical glass core and a glass casing. Light travels through the core and is confined to the core by internal reflection from the glass casing. Light signals may be propagated over long distances with little loss of signal strength. For some optical fibers, a polymeric (e.g., acrylate) buffer layer overlies the core and casing to protect them.

As optical fiber technology has progressed, a number of different types of fiber structures have been developed for use in optical fiber systems. For example, laser diode light sources are available in fiber form. Light energy is input through the lateral surfaces of the laser diode fiber, and a monochromatic beam is produced from the end of the laser diode fiber. Each laser diode fiber is typically quite small in size, about 0.005 inch in diameter. To make a satisfactory light source for many applications requiring increased output energy, a number of the laser diode fibers may be bundled together.

In some applications, the light output of the laser diode fiber or fiber bundle must be introduced axially into a second optical-type fiber such as an optical fiber or an amplifier fiber. To accomplish the transition of the light from the laser diode light sources into the second fiber, the output must be focused onto the end of the second fiber. The devices currently available for performing the transition are generally not robust and can easily become misaligned or misadjusted. Further, they are not qualifiable for space applications.

There is a need for an improved optical transition device that accomplishes the transition function between optical devices of a fiber configuration, is robust, and may be qualified for space applications. The present invention fulfills this need, and further provides related advantages.

SUMMARY OF THE INVENTION

The present invention provides an optical transition device that connects two fibers in an end-to-end fashion, so that light emanating from one is transmitted into the other. The optical transition device is made with a high degree of precision, and that precision is retained in service in a variety of circumstances due to the nature of the construction and the closely matched coefficients of thermal expansion of the elements of the optical transition device. No active or manual alignment is required. The magnification of the light transition may be set according to mechanical elements used in the optical transition device. The optical transition device accommodates a wide variety of types and sizes of fibers on either side of the transition. The optical transition device is suitable for high power applications, such as up to 5 watts on the input side. The optical transition device is space qualifiable.

In accordance with the invention, an optical transition device comprises a first transition body having a first transition body bore therethrough, a first fiber connector connected to the first transition body and having a first connector bore therethrough, a second transition body affixed to the first transition body and having a second transition body bore therethrough, and a second fiber connector connected to the second transition body and having a second connector bore therethrough. The first connector bore, the first transition body bore, the second transition body bore, and the second connector bore are coaxial and aligned along a transition axis. A lens, preferably a graded-index lens for applications of interest to the inventors, is disposed within at least one of the first transition body bore and the second transition body bore with an optical axis of the lens coincident with the transition axis. An axial positioning structure is optionally disposed adjacent to the lens, to position the lens axially along the transition axis. Optionally, a heat sink overlies the first and second transition bodies.

This device structure rigidly aligns the fibers on either side of the transition and the lens. No manual or active alignment is required, and there is nothing to become misaligned with time, service, mechanical forces, shocks, or as a result of temperature changes. The materials of construction are all suitable for use in a space environment, and therefore the optical transition device is space qualifiable.

The nature of the fiber structures on either side of the transition determines the selection of the connectors. In one application, one connector (serving as an input connector) is adapted for connecting to a bundle of laser diode light sources, and the other connector (serving as an output connector) is adapted for connecting to an optical fiber, a laser fiber, or an amplifier fiber.

The axial positioning structure includes at least one of a first spacer disposed in the first transition body bore, a middle spacer disposed between the first transition body and the second transition body, and a second spacer disposed in the second transition body bore. The first and second spacers are positioned on each side of the lens, and more preferably a sleeve that holds the lens, so that the axial position of the lens along the transition axis is determined by the length of each spacer, which is established at the time of manufacture. The magnification and focusing of the optical transition device is thereby determined by the axial positioning of the lens.

The first transition body and the second transition body are desirably made of a material, preferably type 410 stainless steel, having a coefficient of thermal expansion close to that of the glass lens, to minimize differential thermal strains and the possibility of damage to the glass lens during temperature changes. The elements of the optical transition device are positively connected together by bolting, screwing, or the like. These features, in combination with the basic structure, give the optical transition device great resistance to loss of alignment.

The present invention therefore provides a readily manufactured, highly stable, versatile optical transition that may be used with many types of fiber structures. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a perspective view of an optical transition device according to the invention; and FIG. 2 is a schematic sectional assembly drawing of the optical transition device of FIG 1, taken along line 2—2.

DETAILED DESCRIPTION OF THE INVENTION

FIG. 1 depicts an optical transition device 20 in exterior view, and FIG. 2 illustrates the optical transition device 20 in sectional view.

The optical transition device 20 includes a first transition body 22 having a first transition body bore 24 therethrough. A first fiber connector 26 is connected to the first transition body 22, preferably with a threaded connection. The first fiber connector 26 has a first connector bore 28 therethrough. A second transition body 30 is mechanically affixed to the first transition body 22 by any operable approach, such as the illustrated flanges 32 (with bolts through facing openings therein, not shown), a threaded fitting, or the like. The flanges 32 and associated bolts also provide a convenient approach for attaching the optical transition device 20 to a supporting structure such as a panel or a wall.

The second transition body 30 has a second transition body bore 34 therethrough. A second fiber connector 36 is connected to the second transition body 30, preferably with a threaded connection. The second fiber connector 36 has a second connector bore 38 therethrough. The first connector bore 28, the first transition body bore 24, the second transition body bore 34, and the second connector bore 38 are coaxial along a transition axis 40, but are not necessarily of the same diameter or of constant diameter, as will be discussed subsequently. The bores 28, 24, 34, and 38 are preferably circular in cross section and cylindrically symmetric, but may have other operable shapes.

A lens 42 is disposed within at least one of the first transition body bore 24 and the second transition body bore 34, with an optical axis of the lens 42 coincident with the transition axis 40. Preferably, the lens 42 is placed inside a hollow cylindrical tubular sleeve 44 to support it, and the sleeve 44 fits snugly within the first transition body bore 24 and the second transition body bore 34. The sleeve 44 is preferably slightly longer than the lens 42 in the direction parallel to the transition axis 40, so that the axial positioning structure, discussed subsequently, contacts the sleeve and not the faces of the lens. The assembly may be made without a sleeve, but there is a greater possibility of damaging the lens, and therefore the embodiment using the sleeve is preferred. The lens 42 is preferably a graded-index glass lens. Such graded-index lenses are available commercially in a variety of sizes and optical powers, from vendors such as NSG America. In a prototype design developed by the inventors, the graded-index lens was a 4 millimeter, 0.29 pitch, SLW lens.

An axial positioning structure 46 is preferably disposed adjacent to the lens 42. The axial positioning structure 46 positions the lens 42 axially along the transition axis 40. This axial positioning serves to establish the focus and magnification of the lens 42. The preferred axial positioning structure 46 is a fixed structure that is selected and installed at the time of fabrication of the optical transition device 20 and does not change during service. However, the lens 42 and/or the axial positioning structure 46 may be changed by disassembling the optical transition device, removing the old elements, and installing new elements.

In a preferred embodiment, the axial positioning structure includes one or more of three spacers. A first spacer 48 is disposed in the first transition body bore 24, adjacent to a first end 50 of the sleeve 44. The first spacer 48 is a hollow cylinder, whose inner diameter is sufficiently large for the light beam to pass therethrough, and whose length is selected in the manner to be discussed subsequently. A middle spacer 52 is disposed between the first transition body 22 and the second transition body 30, preferably between the respective flanges 32 as illustrated. The middle spacer 52 is used to establish the length of the optical fiber transition device 20, and more specifically the distance between the ends of the fibers between which light communication is established. A second spacer 54 is disposed in the second transition body bore 34, adjacent to a second end 56 of the sleeve 44. The second spacer 54 is a hollow cylinder, whose inner diameter is sufficiently large for the light beam to pass therethrough, and whose length is selected in the manner to be discussed subsequently.

In FIG. 2, the first spacer 48 is illustrated as longer than the second spacer 54 (which is illustrated as washer-like) in the direction parallel to the transition axis 40, so that the lens 42 is positioned to the right of the centerline defined by the plane of meeting of the flanges 32. To move the lens 42 axially parallel to the transition axis 40, the relative lengths of the spacers 48 and 54 is changed, while keeping their total length constant so that the sleeve 44 and thence the lens 42 is held in the desired axial position as established by the spacers 48 and 54. The total length of the optical transition device 20 is increased with the use of the middle spacer 52 of a selected length.

The lens 42 fits within the sleeve 44, which in turn fits snugly within the first transition body bore 24 and the second transition body bore 34. The lens is therefore constrained against lateral movement in the direction perpendicular to the transition axis 40. The first spacer 48 and the second spacer 54 constrain the sleeve 44 and the lens 42 against movement in the direction parallel to the transition axis 40. Accordingly, the alignment and position of the lens 42 are maintained precisely to within machining tolerances. No manual or active adjustments or positioning are required, so that there are no parameters which may change during service with the result that the precise alignment and positioning of the lens 42 are lost.

The first transition body 22, the second transition body 30, the sleeve 44, and the spacers 48, 52, and 54 are preferably made of a material whose coefficient of thermal expansion is reasonably closely matched to that of the lens 42. The preferred material of construction of these elements 22, 30, 44, 48, 52, and 54 is type 410 stainless steel, having a coefficient of thermal expansion of about $9.9 \times 10^{-6}/°$ C. The coefficient of thermal expansion of the lens 42, which is made of glass, is about $10 \times 10^{-6}/°$ C. By matching the coefficients of thermal expansion of these elements reasonably well, the lens stays firmly positioned even during temperature changes, so that the precise alignment and positioning is maintained. Additionally, there is little chance of damage to the lens as a result of differential thermal strains and stresses resulting from temperature changes.

In the embodiment shown in FIG. 2, the first fiber connector 26 is internally sized to receive and hold a bundle of laser diode fibers 58. The second fiber connector 36 is internally sized to receive and hold a single laser fiber 60. Light emitted at the ends of the laser diode fiber bundle 58 is focused by the lens 42 onto the end of the laser fiber 60, and thereafter transmitted along the laser fiber. A virtue of the present invention is that the nature of the fibers which are connected together optically by the optical transition device 20 may be changed simply by using different fiber connectors 26 and 36. Such fiber connectors are available commercially for various types of fibers from vendors such as AMP and Rifocs.

A hollow tubular heat sink 62, illustrated as a two-piece sleeve, may optionally be placed over the first transition body 22 and the second transition body 30, to remove heat generated therein during service. The sleeve 62 is preferably made of copper.

The optical transition device of the invention is space qualifiable, when tested by the method set forth in ASTM E595. It has no resin, adhesives, lubricants, or other elements to outgas, and type 410 stainless steel and glass do not degrade in the radiation environment of space, except that the glass may darken somewhat with extended exposure. The optical transition device is suitable for high-power applications of up to about 5 watts input power, whereas available transition devices are not suitable for high-power applications.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical transition device, comprising:
   a first transition body having a first transition body bore therethrough;
   a first fiber connector connected to the first transition body and having a first connector bore therethrough;
   a second transition body affixed to the first transition body and having a second transition body bore therethrough;
   a second fiber connector connected to the second transition body and having a second connector bore therethrough, wherein the first connector bore, the first transition body bore, the second transition body bore, and the second connector bore are coaxial along a transition axis;
   a lens disposed within at least one of the first transition body bore and the second transition body bore with an optical axis of the lens coincident with the transition axis; and
   an axial positioning structure disposed adjacent to the lens, to position the lens axially along the transition axis.

2. The optical transition device of claim 1, wherein the axial positioning structure includes at least one of
   a first spacer disposed in the first transition body bore,
   a middle spacer disposed between the first transition body and the second transition body, and
   a second spacer disposed in the second transition body bore.

3. The optical transition device of claim 1, wherein the axial positioning structure comprises
   a first spacer disposed in the first transition body bore,
   a middle spacer disposed between the first transition body and the second transition body, and
   a second spacer disposed in the second transition body bore.

4. The optical transition device of claim 1, wherein the first fiber connector is a laser diode fiber bundle connector.

5. The optical transition device of claim 1, wherein the second fiber connector is an optical fiber connector.

6. The optical transition device of claim 1, further including
   a sleeve which receives the lens therein.

7. The optical transition device of claim 1, wherein the first transition body and the second transition body are made of type 410 stainless steel.

8. The optical transition device of claim 1, further including
   a heat sink overlying the first transition body and the second transition body.

9. The optical transition device of claim 1, wherein the lens is a graded-index lens.

10. An optical transition device, comprising:
    a first transition body having a first transition body bore therethrough;
    a first fiber connector connected to the first transition body and having a first connector bore therethrough;
    a second transition body affixed to the first transition body and having a second transition body bore therethrough;
    a sleeve received within the first transition body bore and the second transition body bore;
    a second fiber connector connected to the second transition body and having a second connector bore therethrough, wherein the first connector bore, the first transition body bore, the second transition body bore, and the second connector bore are coaxial along a transition axis;
    a first spacer disposed in the first transition body bore adjacent to a first end of the sleeve along the transition axis;
    a middle spacer disposed between the first transition body and the second transition body;
    a second spacer disposed in the second transition body bore adjacent to a second end of the sleeve along the transition axis; and
    a graded-index lens disposed within the sleeve, with an optical axis of the lens coincident with the transition axis, the lens lying axially between the first spacer and the second spacer.

11. The optical transition device of claim 10, wherein the first fiber connector is a laser diode bundle connector.

12. The optical transition device of claim 10, wherein the second fiber connector is an optical fiber connector.

13. The optical transition device of claim 10, wherein the first transition body and the second transition body are made of type 410 stainless steel.

14. The optical transition device of claim 10, further including
    a heat sink overlying the first transition body and the second transition body.

\* \* \* \* \*